US007944995B2

(12) United States Patent
Skarby et al.

(10) Patent No.: US 7,944,995 B2
(45) Date of Patent: May 17, 2011

(54) VARIABLE BANDWIDTH RECEIVER

(75) Inventors: Ulf Skarby, Lidingö (SE); Karl Gösta Sahlman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1095 days.

(21) Appl. No.: 11/545,782

(22) Filed: Oct. 11, 2006

(65) Prior Publication Data
US 2007/0110198 A1    May 17, 2007

Related U.S. Application Data

(60) Provisional application No. 60/735,835, filed on Nov. 14, 2005.

(51) Int. Cl.
*H03K 9/00*    (2006.01)
(52) U.S. Cl. ........ 375/316; 375/317; 375/240; 370/343; 370/481; 370/484
(58) Field of Classification Search .................. 375/316, 375/317, 240; 370/343, 481, 484, 123
See application file for complete search history.

(56) References Cited

U.S. PATENT DOCUMENTS

| | | | | |
|---|---|---|---|---|
| 5,392,044 A * | 2/1995 | Kotzin et al. | ................. | 341/155 |
| 5,659,546 A * | 8/1997 | Elder | ............................ | 370/343 |
| 6,480,528 B1 * | 11/2002 | Patel et al. | .................... | 375/148 |
| 2004/0001427 A1 * | 1/2004 | Belotserkovsky et al. | ... | 370/208 |
| 2004/0218523 A1 * | 11/2004 | Varshney et al. | ............. | 370/208 |
| 2004/0233841 A1 * | 11/2004 | Sanada et al. | ................. | 370/210 |
| 2006/0109939 A1 * | 5/2006 | Ciccarelli et al. | ............. | 375/350 |
| 2006/0291428 A1 * | 12/2006 | Filipovic | ....................... | 370/335 |
| 2007/0004337 A1 * | 1/2007 | Biswas et al. | ................ | 455/63.1 |

FOREIGN PATENT DOCUMENTS
WO    95/29567    11/1995

OTHER PUBLICATIONS
Translation of Chinese official action, Jun. 28, 2010, in corresponding Chinese Application No. 2006/80042341.

* cited by examiner

*Primary Examiner* — David C. Payne
*Assistant Examiner* — Zewdu Kassa

(57) ABSTRACT

A variable bandwidth receiver uses allocated bandwidth more efficiently and ensures that blocking signals do not overload receiver components. The receiver includes multiple branches for receiving a first bandwidth signal. Each receiver branch has a filter for passing signals in a frequency band corresponding to a second bandwidth less that the first bandwidth and an analog-to-digital converter for converting the baseband signal into a digital signal. A controller digitally combines the digital signals from two or more of the receiver branches to produce a received signal having a bandwidth substantially wider than the first bandwidth. Because combining is done after analog-to-digital conversion in the digital domain, the controller can combine the digital signals from two or more of the receiver branches having adjacent corresponding frequency bands without the normal guard band separating them.

17 Claims, 9 Drawing Sheets

$X = \Sigma\ X1 + X2 + X3 + X4$

VARIABLE BANDWIDTH RECEIVER

CROSS-REFERENCES TO RELATED APPLICATIONS

This application claims domestic priority from provisional application Ser. No. 60/735,835, filed Nov. 14, 2005, the disclosure of which is incorporated herein by reference.

TECHNICAL FIELD

The technical field relates to radio communications. The technology described relates to radio receiving apparatus.

BACKGROUND

Since bandwidth is a limited resource, there is always a need for more efficient and flexible use of communications bandwidth, and this is particularly so for radio communications. Traditionally, bandwidth is allocated in fixed frequency bands that are assigned operators and users. Recent communications systems have introduced variable bandwidth transmitters and receivers so that the bandwidth can be allocated in amounts as needed. To accommodate this variable bandwidth flexibility, receivers must be able to receive signals over a large frequency band.

But there are problems with wideband receiving. One problem is so-called blocking signals. Blocking signals are signals received a relatively high amplitude that cause one or more components in the receiver to saturate, malfunction, or operate in an undesirable fashion. For example, a blocking signal may saturate one or more amplifiers in the receiver chain or an analog-to-digital converter for digital communications receivers. A blocking signal may only have a narrow frequency band, but nevertheless, its high amplitude can saturate and overpower the entire operation of the wideband receiver. The wider the frequency over which the bandwidth can vary, the more likely that a blocking signal will be received and the receiver overloaded.

Another problem with wideband receiving relates to the initial bandlimiting filter typically used in receivers. A bandpass filter passes frequencies within a certain range and rejects (attenuates) frequencies outside that range. In practice, no bandpass filter is ideal, and thus, does not attenuate all frequencies outside the desired frequency range completely. In particular, there is a region just outside the intended passband where frequencies are attenuated, but not sufficiently rejected. This is known as the filter roll-off, and is usually expressed in decibels (dB) of attenuation per octave of frequency. Filter designs seek to make the roll-off as steep as possible—sometimes referred to as a filter with a high Q or quality factor—and thus for the filter to perform as close as possible to its design. But as the roll-off is narrowed, the passband is no longer flat and begins to "ripple." The steeper the filter roll-off, the more selective the filter.

A steeper filter roll-off becomes more and more difficult to achieve as the width of the passband increases. The result is that a wider bandwidth bandpass filter must use a lower percentage of the allocated bandwidth as compared to a narrower bandwidth bandpass filter. For example, a 1 MHz bandpass has a steeper filter roll-off "skirt" than a 5 MHz bandpass filter for the same number of poles. FIGS. 1A and 1B illustrate this phenomena. The 1 MHz bandpass filter in FIG. 1A passes one fifth of the 5 MHz filter. The roll-off skirt on either side of the passband in the 1 MHz filter is about 0.12 MHz. Information cannot be reliably received in these filter skirt bands, and as a result, 0.24 MHz of 1 MHz bandwidth cannot be used and is wasted. The 5 MHz bandpass filter in FIG. 1B only passes 3.84 MHz. The roll-off skirt on either side of the passband is 0.58 MHz. As a result, 1.16 MHz of bandwidth cannot be used, and about five times as much bandwidth is wasted as compared to the 1 MHz filter.

But combining multiple narrow bandpass filters to approximate a wider bandpass is also problematic. Even using steeper filter skirts, there is still significant unuseable bandwidth. This is because a sufficient guard band normally must be provided between adjacent frequency bands to prevent them from interfering with each other. The guard band is usually the same or more bandwidth than the bandwidth of the filter's roll-off skirt. Two adjacent 5 MHz frequency bands are shown in FIG. 2. Neither the filter passbands nor the filter skirts are permitted to overlap. Consequently, the guard band between the two fields is twice the bandwidth of one side of the filter skirt or 1.16 MHz. To make matters worse, communications specifications also often require that an even greater distance offset distance than the guard band be maintained from a closest blocking signal to the center frequency of the pass band. In FIG. 2, the example blocking signal offset is shown as 2.9 MHz. As a result of all these various limitations, only 7.68 MHz out of 10 MHz in this example of FIG. 2 can actually be used for communications.

SUMMARY

A variable bandwidth receiver uses allocated bandwidth more efficiently and reduces the chances that blocking signals will adversely affect one or more receiver components. The receiver includes multiple receiver branches for receiving a first bandwidth signal. Each receiver branch has a filter for passing signals in a frequency band corresponding to a second bandwidth less that the first bandwidth and an analog-to-digital converter for converting the baseband signal into a digital signal. A controller digitally selects and combines the digital signals from two or more of the receiver branches to produce a received signal having a bandwidth substantially wider than the first bandwidth. Because combining is done after analog-to-digital conversion in the digital domain, the controller can digitally combine the digital signals from two or more of the receiver branches having adjacent corresponding frequency bands without the normal guard band separating them. The filter roll-off skirts between adjacent narrowband filters can effectively be removed from the digital signals before the signals are combined.

By digitally selecting the receiving branches to be used, the controller can also avoid selecting a receiving branch that has a blocking signal in its corresponding frequency band. Alternatively, if a blocking signal occurs in the passband of one of the selected filter branches, the controller can adjust an automatic gain control for that receiver branch to significantly attenuate that blocking signal to minimize the impact of the blocking signal on adjacent receiving branches.

In one example implementation, the signals are transmitted using orthogonal frequency division multiplexing (OFDM) with the receiver in such an example being an OFDM receiver. The controller performs fast Fourier transform processing on the digital signals from selected ones of the receiver branches to generate multiple subband signals. Certain ones of those subband signals are selected and then combined to generate a wide bandwidth received signal.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using non-limiting example applications to different radio receiver embodiments, the technology may be employed to any type of radio receiver. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1A:
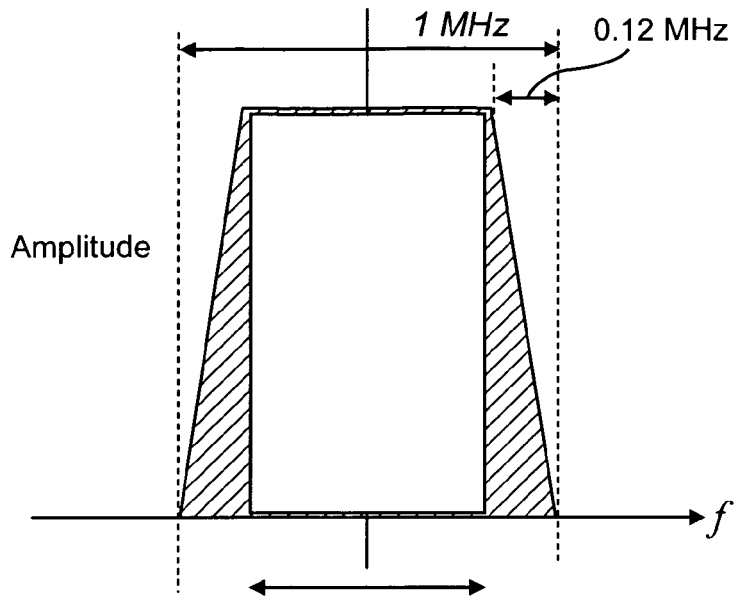
FIG. 1A illustrates a passband for a 1 MHz filter.
Figure 1B:
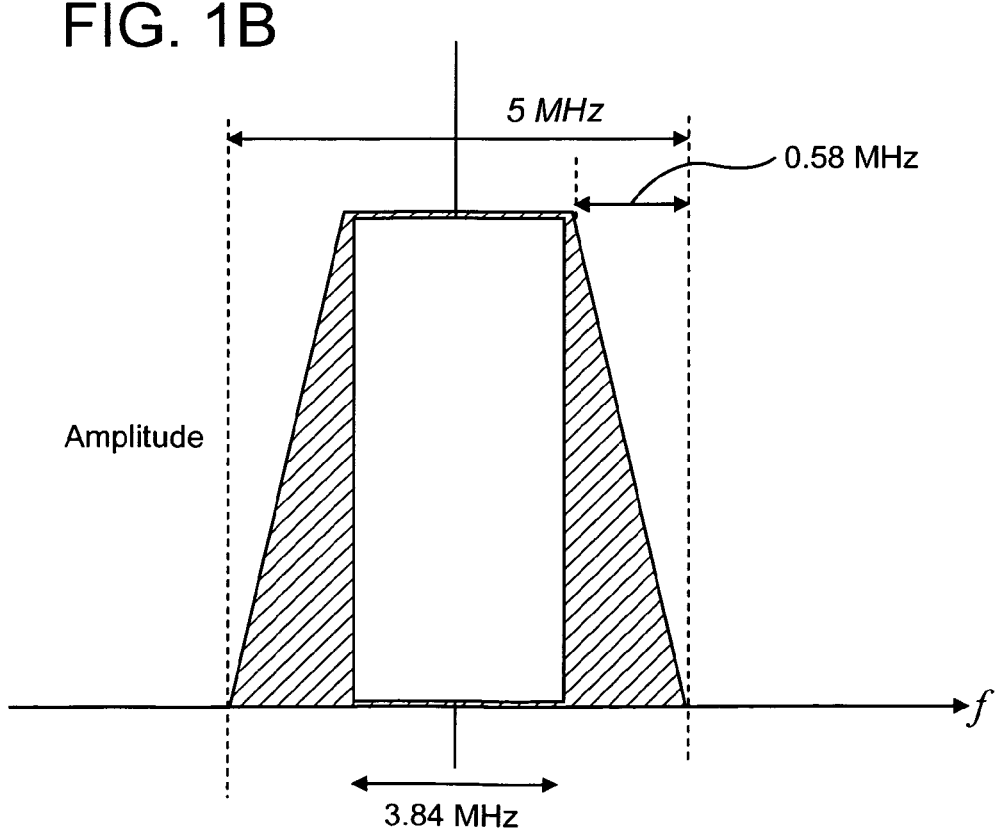
FIG. 1B illustrates a passband for a 5 MHz filter.
Figure 2:
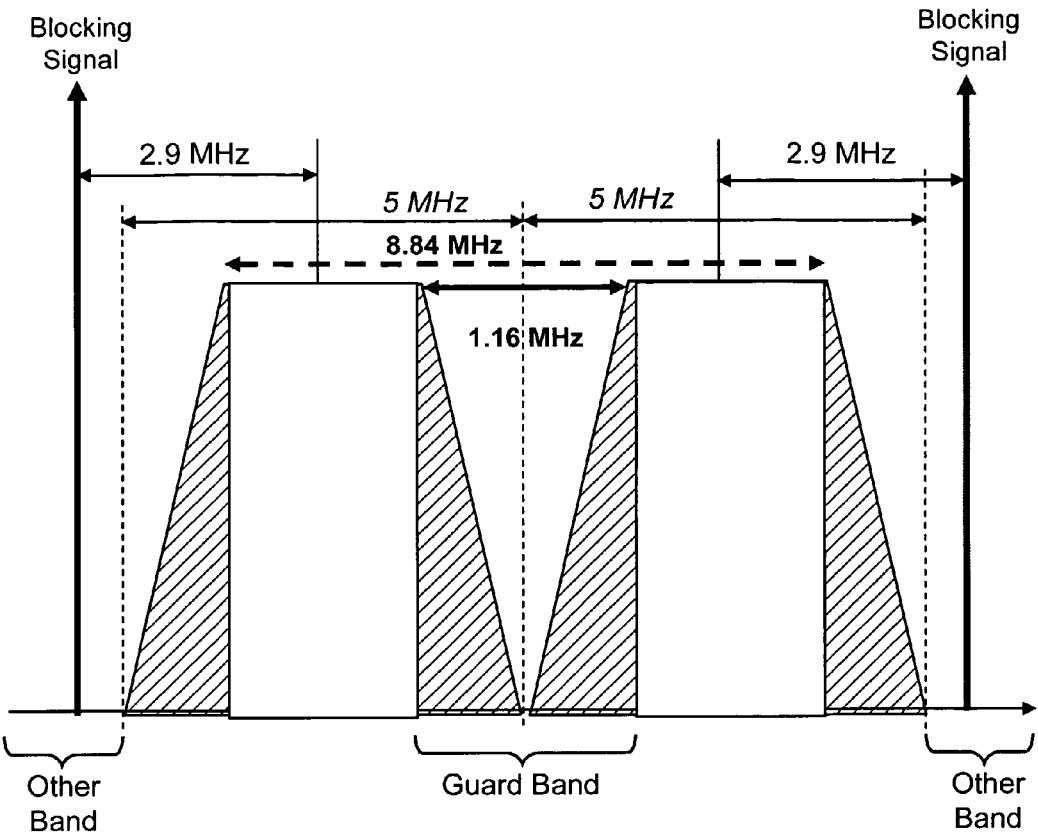
FIG. 2 illustrates passbands for adjacent 5 MHz filters separated by a guard band.
Figure 3:
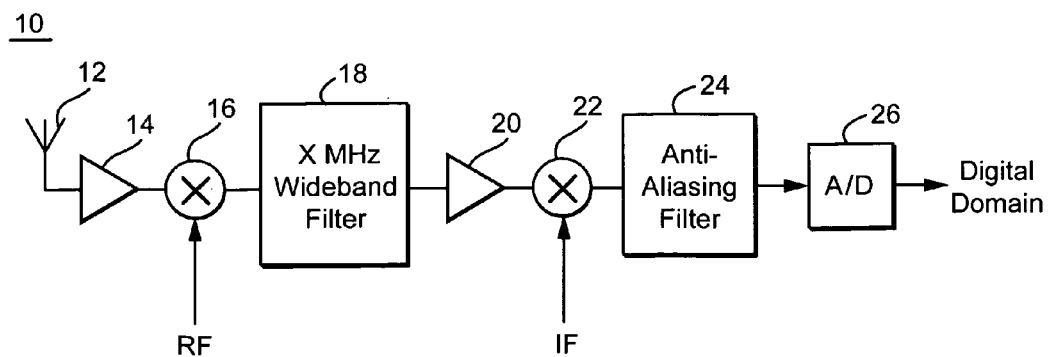
FIG. 3 is a diagram illustrating a non-limiting example receiver with a wideband bandpass filter.

FIG. 3 illustrates a function block diagram of a non-limiting example receiver 10 with a wideband bandpass filter. An antenna 12 receives a radio signal which is amplified in amplifier 14 before being frequency down-converted in a radio frequency (RF) mixer 16 to an intermediate frequency (IF). The intermediate frequency signal is then filtered in an "X" MHz wideband bandpass filter 18. The frequency band "X" of the wideband filter 18 is normally set for a certain bandwidth. The filtered signal is amplified in amplifier 20 before being frequency down-converted to baseband in an IF mixer 22. The baseband signal is then filtered in an anti-aliasing filter 24. The output of filter 24 is converted into digital format in an analog-to-digital (A/D) converter 26 for further processing in the digital domain.

Figure 4A:
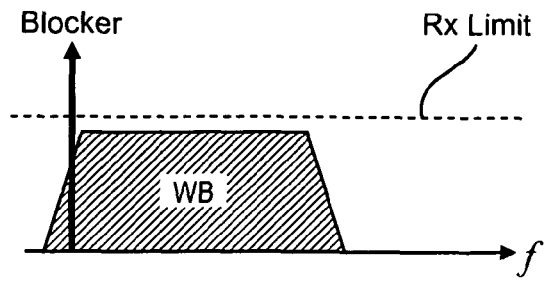
FIG. 4A illustrates a blocking signal in the pass band of a wideband bandpass filter.

One of the problems outlined in the background with using a single wideband filter is that the gradual roll-off skirt can pass a blocking signal which can saturate/overload one or more of the components of the receiver chain. FIG. 4A is an example showing a bandpass filter profile of a wideband (WB) filter. On one side of the filter passband, a blocking signal (shown as a bold vertical arrow) exceeds a receiver saturation/overload limit. For example, the analog-to-digital converter 26 of the receiver 10 shown in FIG. 3 may completely saturate when a blocking signal is received in the passband that exceeds this receiver limit. As a result, the output of the analog-to-digital converter is unreliable as long as the blocking signal is present.

As explained in the background, one way to ameliorate the problems of a blocking signal is to cascade a number of adjacent narrowband filters which when summed together provide essentially the same passband as the wideband bandpass filter shown in FIG. 4A. The slope of the filter roll-off "skirt" is sufficiently steep so that it does not pass the high amplitude blocking signal. As a result, the receiver 10 is not saturated/overloaded. But a problem with cascading multiple narrowband bandpass filters is the significant amount of bandwidth wasted on guard bands which separate the adjacent passbands and on minimum distances required from the center of the narrowband task band and a blocking signal. That wasted bandwidth cannot be used to transfer data, and thus, it reduces the efficiency and capacity of the communication system. Consider the example in FIG. 4B where summing adjacent narrower bandpass filters X1+X2+X3+X4 results in a wider bandwidth passband of X. But there must be a guard band separating X1 and X2, a guard band separating X2 and X3, and a guard band separating X3 and X4 in order to compensate for each filter's roll-off skirt.

The inventors discovered a way in which multiple narrowband bandpass filters with adjacent frequency bands could be used in parallel receiving branches so as to pass a desired wideband signal while still avoiding the problems of blocking signals associated with typical single wideband bandpass filters as well as the inefficiencies and wasted bandwidth associated with using multiple narrowband, adjacent frequency bandpass filters. In this regard, reference is made to the non-limiting example receiver 30 shown in FIG. 5. An antenna 32 is coupled to multiple receiver branches 34A . . . 34N. Each receiver branch 34 includes a narrowband filter, and the narrowband (NB) filters in receiver 30 have adjacent frequency bands. The outputs of the multiple receiver branches 34 are selected by a controller 38. Selected receiver branch outputs are efficiently combined in the digital domain in combination circuitry 36 to provide a received wideband signal without wasting bandwidth on guard bands to separate adjacent narrowband filters.

Figure 4B:
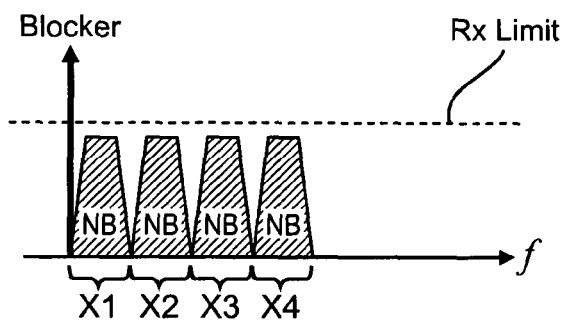
FIG. 4B illustrates a blocking signal near the pass band of one of adjacent narrowband bandpass filters.

As illustrated in FIG. 4B, one advantage of using multiple branches each with a narrowband filter is the very steep slope of the filter skirt which keeps undesired blocking signals near in frequency to the passband from being passed at high amplitude levels by one of the bandpass filters. Another benefit of using multiple narrowband filters is that the controller 38 may select just those receiver branches in which the narrowband filters currently do not have a blocking signal in their corresponding passband. In the example of FIG. 4B, if a blocking signal is present in the second passband, the controller 38 could select only the first, third and fourth receiving branches until it is determined that the blocking signal is no longer present in the passband of the narrowband filter of the second receiving branch. Alternatively, the controller 38 could adjust an automatic gain controller (AGC) in the second receiver branch to attenuate the signals in its passband—including the blocking signal—sufficiently so adverse affects from the blocking signal are reduced or avoided. When the blocking signal is no longer present, the controller 38 may direct the AGC in the second receiver branch to restore the gain to a higher value.

Figure 5:
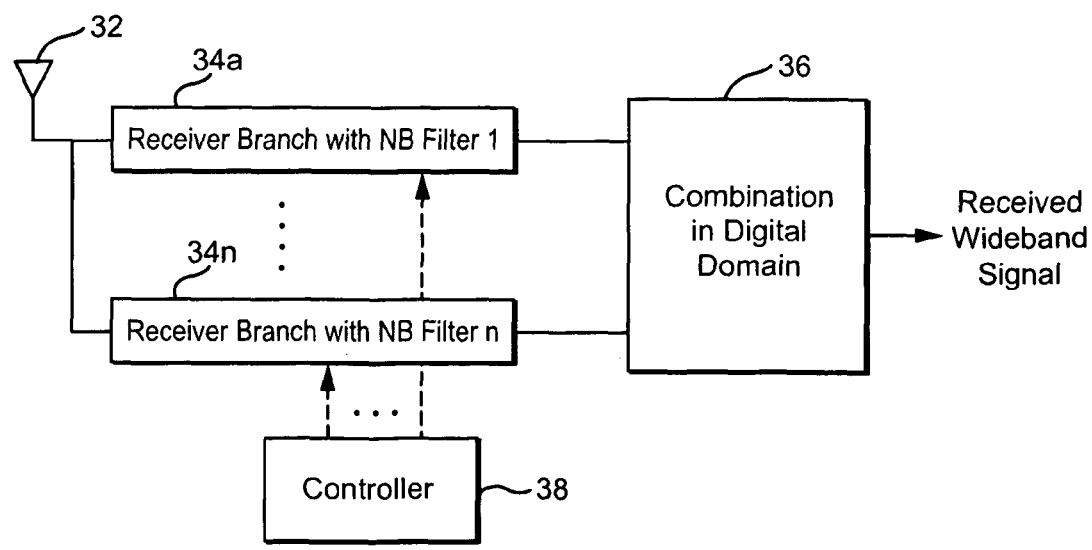
FIG. 5 is a function block diagram illustrating a non-limiting example receiver with multiple receiving branches the outputs of which are combined in the digital domain to generate a wideband received signal.
Figure 6:
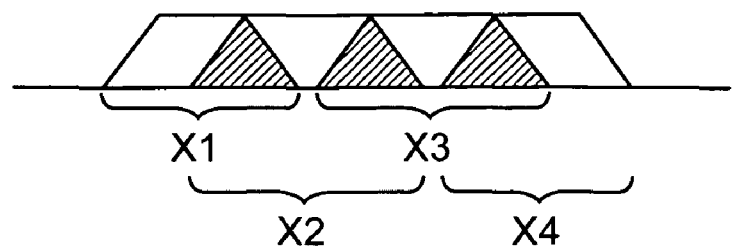
FIG. 6 illustrates the problem and inefficiency with combining adjacent narrowband filtered signals in the analog domain.

Yet another advantage of the multiple branch receiver 30 shown in FIG. 5 is the combination of the receiver branch signals in the digital domain. FIG. 6 illustrates the total wide bandwidth X of the four adjacent narrowband bandpass filters found in FIG. 4B, each having its corresponding passband, labeled as X1, X2, X3, and X4, i.e., X=X1+X2+X3+X4. If these four bandpass signals were combined in the analog domain without intervening guard bands, their filter roll-off skirts would overlap, as illustrated in the cross-hatched areas of FIG. 6. This overlap causes considerable distortion of the signals.

Figure 7:
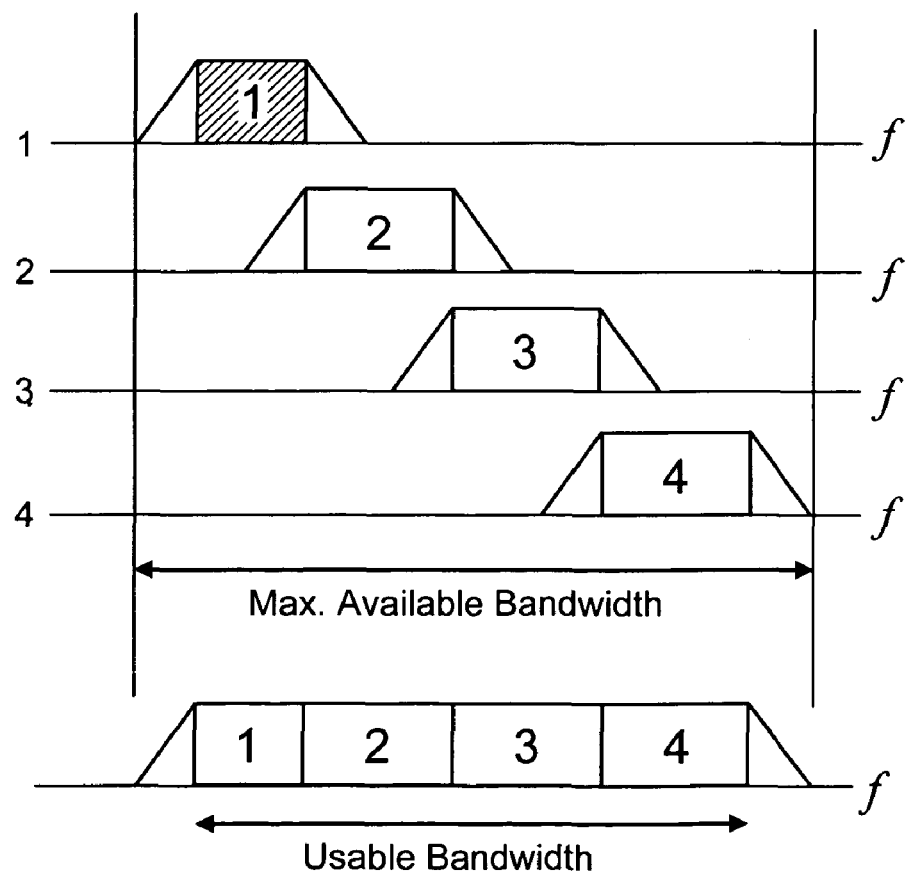
FIG. 7 illustrates the advantages and efficiency with combining adjacent narrowband filtered signals in the digital domain.

But this obstacle is avoided because the multiple branch receiver in FIG. 5 combines each of the narrowband filter outputs of each receiver branch in the digital domain, after analog-to-digital conversion. In this regard, the filter roll-off overlap distortion illustrated in FIG. 6 is avoided as is the need for guard bands between adjacent filter passbands. FIG. 7 illustrates these benefits in graphical form. The bandpass waveform for each of the adjacent narrowband filters of the four receiving branches is shown on a separate line as a trapezoid. Each trapezoid is divided into a center rectangle with abutting triangles. These triangles represent the guard band normally needed on either side of the passband of the narrowband filter to accommodate the filter roll-off skirt. Because the filter outputs are summed in the digital domain, the intervening guard bands are unnecessary. The digital processing circuitry 36 extracts just the passband signals in the rectangular portions of the filter output. Only outer guard bands on the lowest frequency of the narrowband filter in the first receiver branch and the uppermost frequency of the narrowband filter in the last receiver branch are necessary to avoid interference with other frequency bands assigned to other operators, users, etc. As compared to the case in FIG. 6, a much larger usable bandwidth is obtained out of the maximum available bandwidth as shown in FIG. 7. More bandwidth means more call capacity, throughput, speed, and service.

Figure 8:
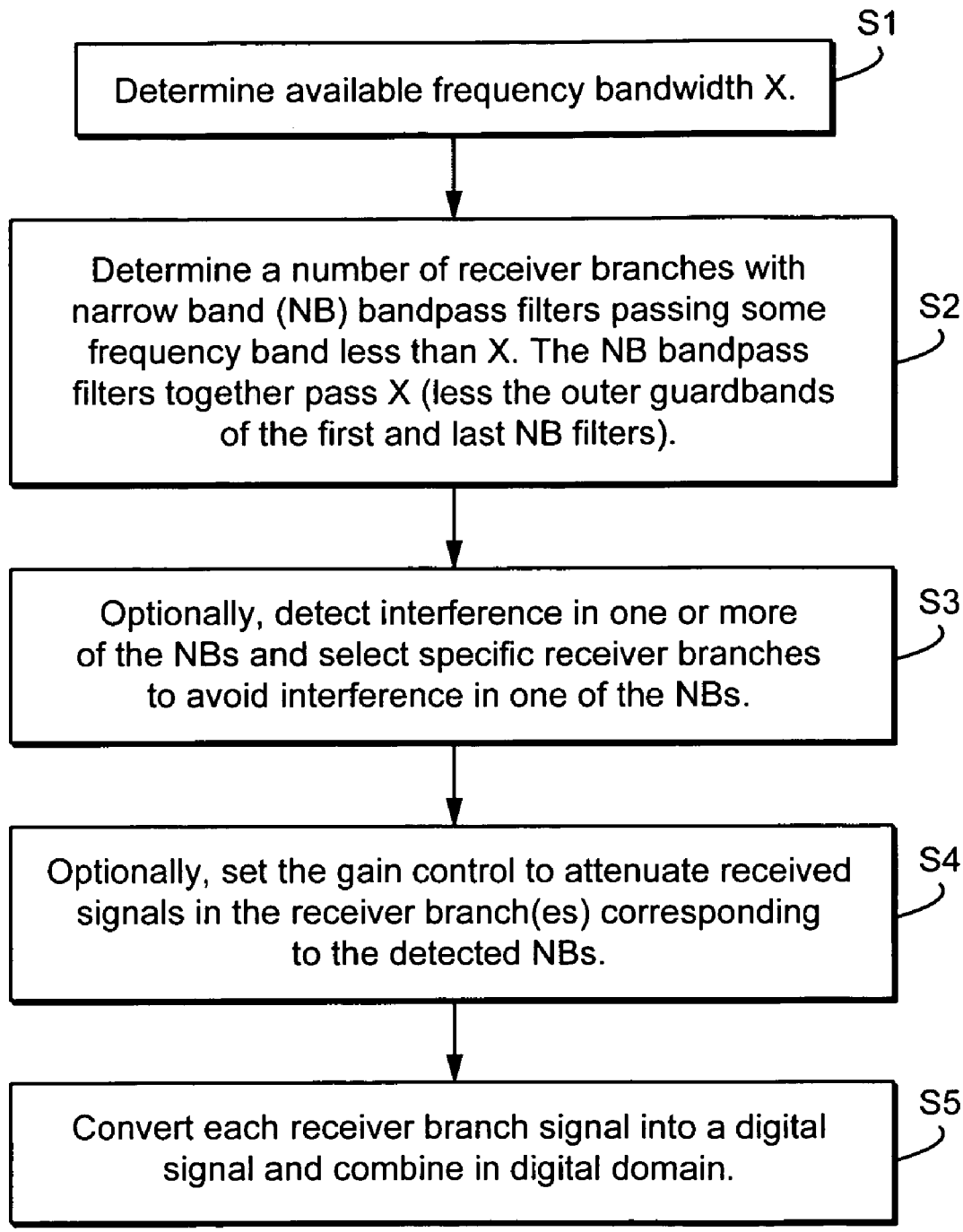
FIG. 8 is flow chart diagram illustrating non-limiting, example procedures that may be used to implement a variable bandwidth filter using multiple receiver branches with digital domain combining.

FIG. 8 is a flowchart diagram illustrating non-limiting example procedures that may be used to implement a variable bandwidth filter using multiple receiver branches with digital domain combining. In step 1, an available frequency bandwidth X is determined. Based on that available frequency bandwidth X, a number of receiver branches with narrower-band bandpass filters is determined in step S2. Each one of the narrower-band bandpass filters passes a frequency band that is less than the wider bandwidth X. When those bandpass filters are combined, they cumulatively pass a frequency band of substantially X, i.e., less than the outer guard bands of the first and last narrowband filters.

The controller 38 may detect that there is interference or a blocking signal in one or more of the narrowband filter frequency bands. The controller 38 can then select those receiver branches that do not have interference or a blocking signal (step S3). Control circuitry in the receiver may also set a gain control in one or more of the selected receiver branches in order to sufficiently attenuate a blocking signal so it does not, for example, saturate/overload one or components in that receiver branch (step S4). The each receiver branch includes an analog-to-digital converter that converts each receiver branch signal into a digital signal, and the digital signals from a selected receiver branches are combined in the digital domain to produce a received wideband signal (step S5).

Figure 9:
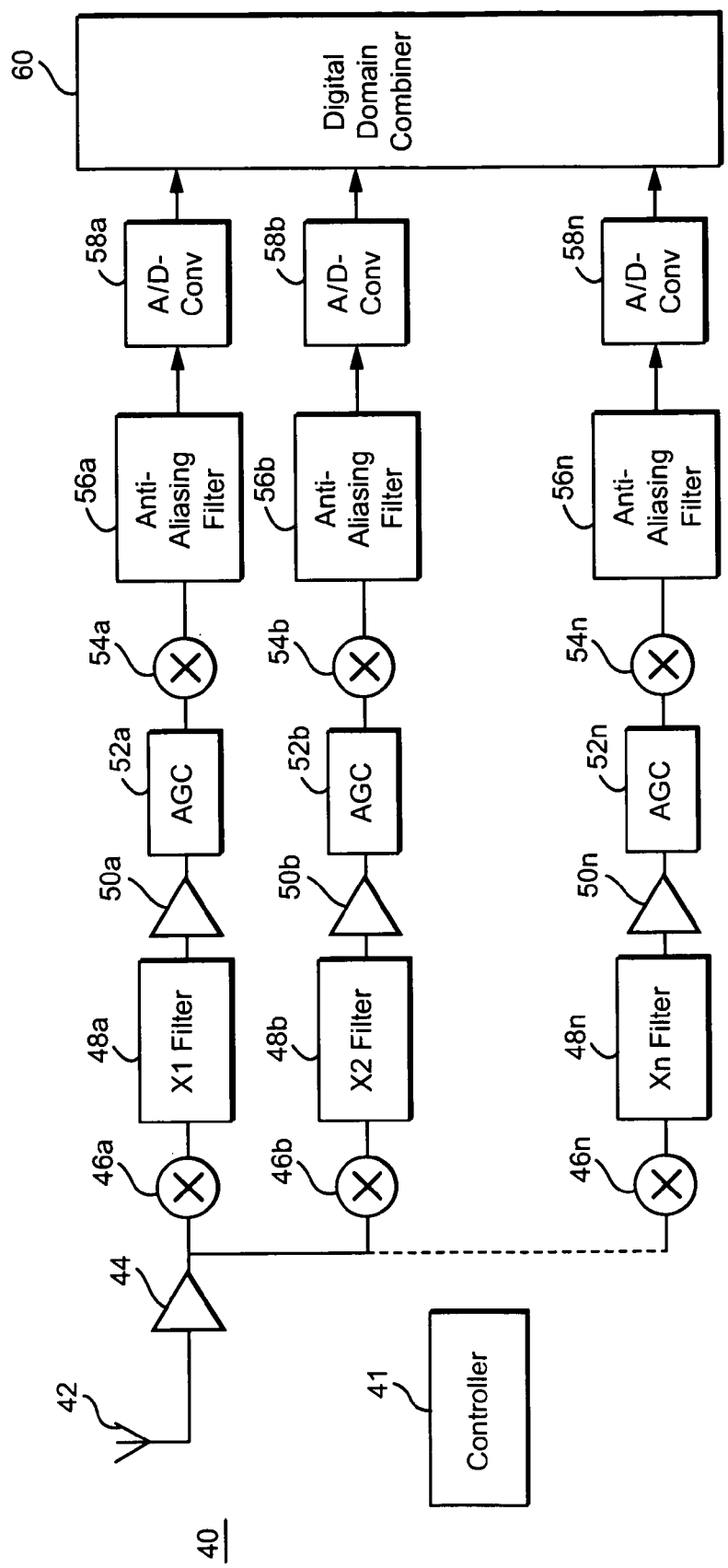
FIG. 9 is a function block diagram of another non-limiting example embodiment of a variable bandwidth filter using multiple receiver branches with digital domain combining.

The technology described can be applied to any type of receiver. Non-limiting, example receivers with multiple receiving branches are now described in conjunction with FIGS. 9-11 where like reference numerals refer to like elements. Receiver 40 shown in FIG. 9 delivers an RF signal via an antenna 42 and an amplifier 44 to a plurality of RF mixers 46A, 46B, . . . 46N. Each mixer corresponds to one of the receiver branches of the receiver 40. The output of the mixer is a frequency down-converted to an intermediate frequency signal which is provided to a corresponding bandpass filter 48A, 48B, . . . 48N. Each filter has a corresponding passband X1, X2, . . . XN. Those passbands are preferably adjacent to one another. The output of each filter is provided to a corresponding amplifier 50A, 50B, . . . 50N, and the amplified output is provided to a corresponding automatic gain controller (AGC) 52A, 52B, . . . 52N. Each AGC output is provided to a corresponding IF mixer 54A, 54B, . . . 54N. The IF mixer converts the signal to baseband, and the baseband signal is passed through a corresponding anti-aliasing filter 56A, 56B, . . . 56N which removes undesirable aliasing effects caused by mixing. The output from the anti-aliasing filter in each branch is provided to a corresponding analog-to-digital converter 58A, 58B, . . . 58N. A controller 41 is provided to select multiple ones of the receiver branches so that the outputs from the selected analog-to-digital converters are provided to a digital domain signal combiner 60 for combining.

Figure 10:
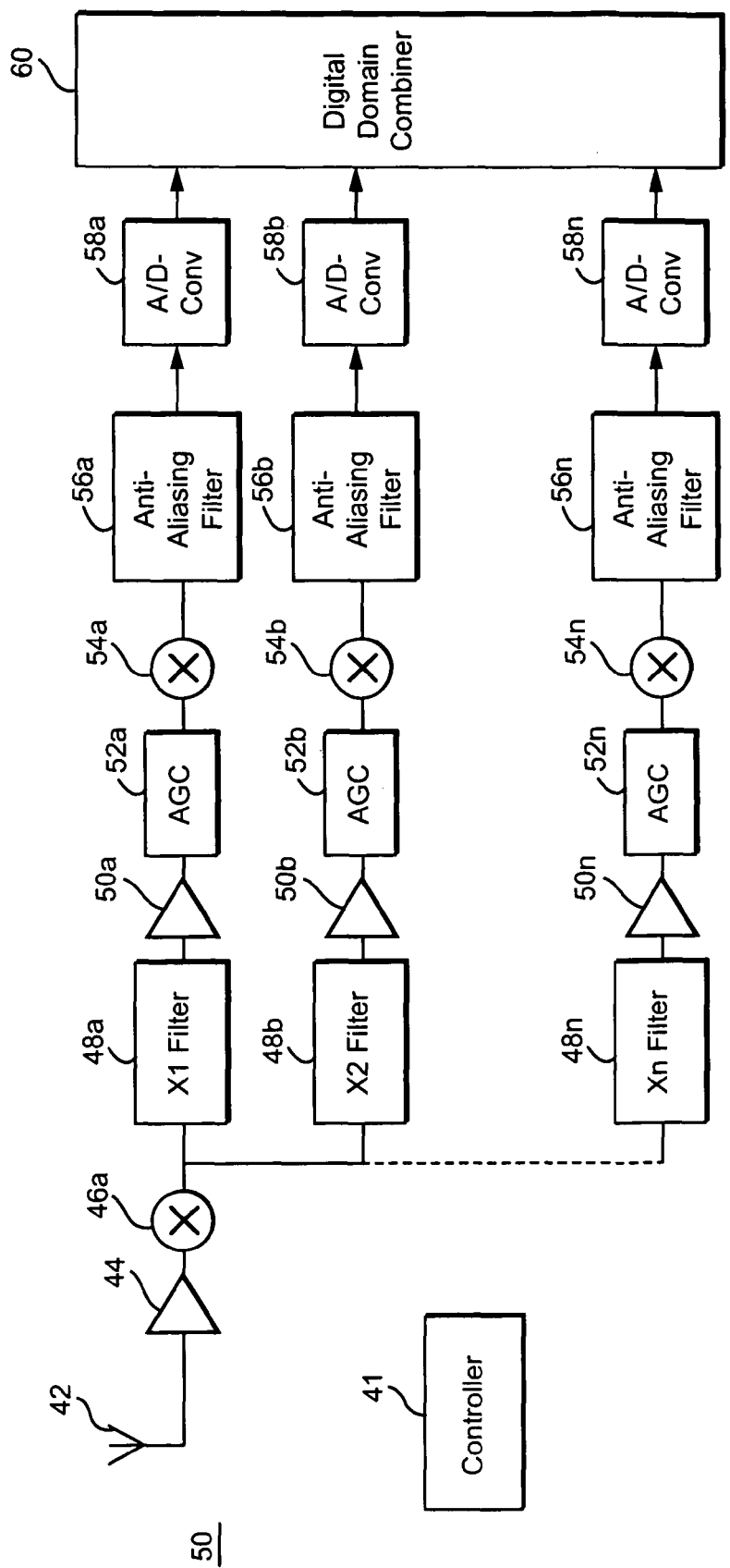
FIG. 10 is a function block diagram of another non-limiting example embodiment of a variable bandwidth filter using multiple receiver branches with digital domain combining.

FIG. 10 illustrates in a non-limiting example receiver 50 similar to receiver 40 except that just one RF mixer 46 is used rather than each filter branch having its own RF mixer. This embodiment saves costs in that only one RF mixer is necessary. As compared to the example in FIG. 9, the example receiver 50 only needs one type of bandpass filter for all branches except the first receiver branch.

Figure 11:
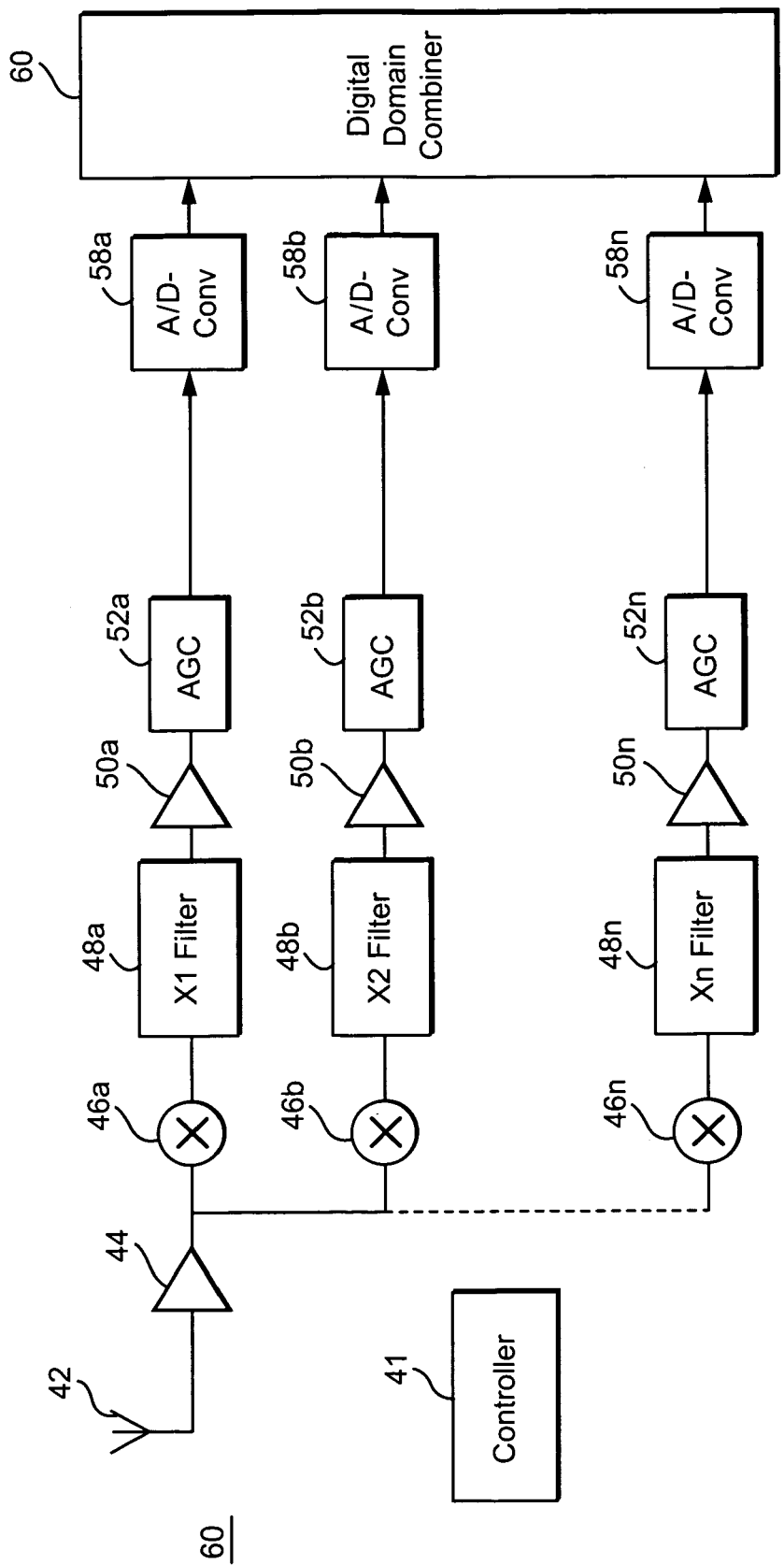
FIG. 11 is a function block diagram of a non-limiting example embodiment of a variable bandwidth filter using multiple receiver branches with digital domain combining for a homodyne type receiver.

The non-limiting, example receiver 60 shown in FIG. 11 is similar to the receiver 50 shown in FIG. 10 except that the received signal is split and provided to an RF mixer 46a, 46b, . . . , 46n for each receiver branch to convert the received signal to baseband. The second IF mixer 54 and the anti-aliasing filters 56 are removed in each branch. Again, cost considerations may make the simplified receiver configuration shown in FIG. 11 a desirable configuration.

Although these examples describe specific components, each receiver branch need only have a bandpass filter and an analog-to-digital converter for converting the baseband signal into a digital signal. Nor do the filter and analog-to-digital converter in each branch need to be separate components. Instead, the processing for multiple receiver branches can be performed using common electronic circuitry.

Figure 12:
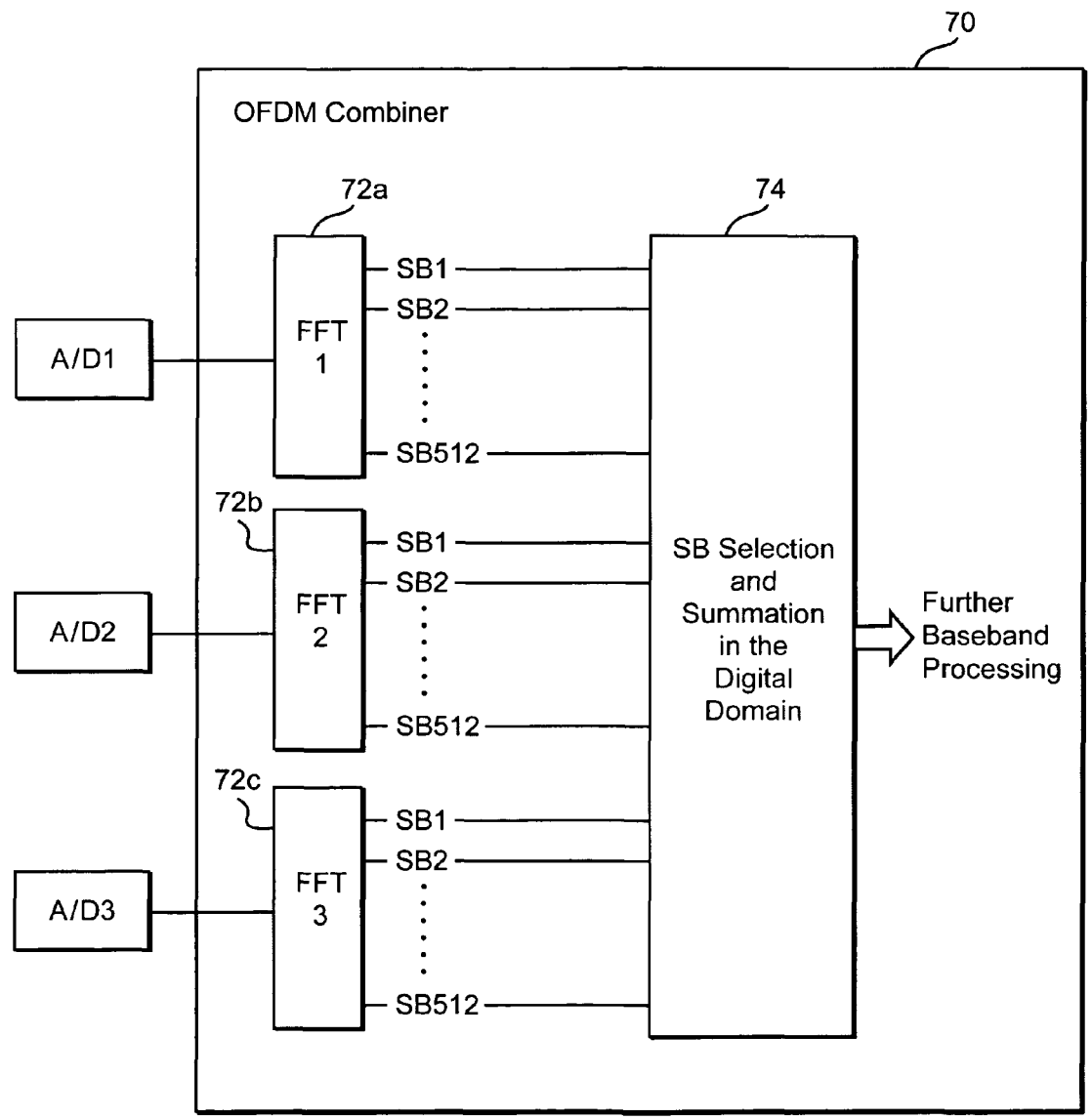
FIG. 12 is a function block diagram of a non-limiting example embodiment of a variable bandwidth filter using multiple OFDM receiver branches with digital domain combining.

Orthogonal frequency division multiplexing (OFDM) is a popular radio transmission technique used in many current communications systems. FIG. 12 shows an example where the receiver can receive OFDM signals from multiple receiver branches (three are shown in the Figure) for combination in the digital domain. Digital data streams from each of the three receiver branches are received in corresponding fast Fourier transform (FFT) processors 72A, 72B, and 72C. These fast Fourier transform processors generate a large number of subbands which are then fed to a digital subband selection and summation block 78. The digital subband selection and summation block 78 selects certain subbands output by each FFT and only sums the selected sidebands together to achieve an undistorted composite signal like that shown in FIG. 7 rather than that shown in FIG. 6. The composite signal is then passed on for further baseband processing.

Consider as a non-limiting example that a total bandwidth of 15 MHz is divided between three receiver branches, each branch having a narrowband bandpass filters with a nominal passband of 5 MHz. The first receiver branch is provided to a first fast Fourier transformer (FFT 1) 72A which converts the digital stream into 512 subbands (SBs) or subcarriers (SC). Each subband is approximately 15 KHz. For the first receiver branch, only 4 MHz is actually be used out of the 5 MHz, since approximately 1 MHz of the passband is used for the two guard bands on the outer edges of the overall 15 MHz frequency band. For simplicity, the bandwidth needed for these two guard bands is removed from the first FFT subbands. So out of a total of 512 subbands output by the first FFT1 72A, the digital subband selection and summation block 78 only selects 266 subbands. Although block 78 may select 266 contiguous subbands anywhere along the 512 subbands, in a preferred example implementation, 266 contiguous subbands are selected from the middle of the 512 subbands rather than starting from lower or upper ends.

On the other hand, the two other receiver branches are able to use all of the allocated 5 MHz. So for the 512 subbands output by each of FFT2 and FFT3, noted at 72B and 72C, the digital subband selection and summation block 78 selects 333 subbands. Again, although the digital subband selection and summation block 78 may select 333 contiguous subbands anywhere along the 512 subbands, in a preferred example implementation, 333 contiguous subbands are selected from the middle of the 512 subbands rather than starting from lower or upper ends. Then the digital subband selection and summation block 78 sums together all the selected subbands, which in this example, total up to 932 (266+333+333=932) subbands to generate a 14 MHz received signal (out of a possible 15 MHz passband) that can be further processed.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A receiver for receiving OFDM signals, comprising:
plural receiver branches for receiving a first bandwidth signal communicated in accordance with an OFDM access scheme and dividing the first bandwidth OFDM signal into multiple overlapping frequency subbands, each receiver branch including a filter for passing OFDM signals in a different one of the overlapping frequency subbands corresponding to a second bandwidth less than the first bandwidth and an analog-to-digital converter for converting the passed OFDM signal into a digital OFDM signal, and
control circuitry for digitally combining the digital OFDM signals from two or more of the plural receiver branches to produce a received OFDM signal having a bandwidth substantially wider than the second bandwidth,
wherein the control circuitry is configured to combine the digital OFDM signals from two or more of the receiver branches having adjacent corresponding frequency subbands without requiring a guard band being between adjacent ones of the corresponding frequency subbands.

2. The receiver in claim 1, wherein the control circuitry is configured to combine the digital OFDM signals from two or more of the receiver branches having adjacent corresponding frequency overlapping subbands to improve a blocking of undesirable signals outside of the first bandwidth.

3. The receiver in claim 1, wherein the receiver is a variable bandwidth receiver, and wherein the control circuitry is configured to select ones of the receiver branches to achieve a desired variable bandwidth.

4. The receiver in claim 3, wherein the control circuitry is configured to select ones of the receiver branches that have corresponding frequency subbands that do not have interfering or blocking signals.

5. The receiver in claim 3, wherein each receiver branch includes an automatic gain controller, and wherein the control circuitry is configured to control a gain setting in the automatic gain controller for one of the selected receiver branches.

6. The receiver in claim 1, wherein the control circuitry is configured to:
perform Fourier transform processing on the digital signals to generate the digital frequency subband signals;
select some but not all of the multiple digital subband signals; and
combine the selected digital frequency subband signals in the digital domain to produce the received signal.

7. The receiver in claim 6, wherein the control circuitry is configured to select the selected digital frequency subband signals as a contiguous block in a middle of the generated multiple digital frequency subband signals such that multiple frequency subbands at both an upper and lower end of the generated multiple digital frequency subband signals are not selected.

8. The receiver in claim 1, wherein each receiver branch includes a first mixer for frequency converting the first bandwidth signal and providing a first frequency converted signal to an input of its bandpass filter, an automatic gain controller connected to an output of its bandpass filter, a second mixer for frequency converting an output of the automatic gain controller and for providing a second frequency converted output to an anti-aliasing filter, the output of the anti-aliasing filter being connected to its analog-to-digital converter.

9. The receiver in claim 1, wherein the receiver includes one mixer for frequency converting the first bandwidth signal and providing a first frequency converted signal to an input of the bandpass filter in each receiver branch, wherein each receiver branch includes an automatic gain controller connected to an output of its bandpass filter, a second mixer for frequency converting an output of the automatic gain controller and for providing a second frequency converted output to an anti-aliasing filter, the output of the anti-aliasing filter being connected to its analog-to-digital converter.

10. The receiver in claim 1, wherein each receiver branch includes a first mixer for frequency converting the first bandwidth signal and providing a first frequency converted signal to an input of the bandpass filter in that receiver branch, and an automatic gain controller connected to an output of the receiver branch bandpass filter for providing a gain-controlled output to the receiver branch analog-to-digital converter.

11. A method for use in a receiver having plural receiver branches for receiving OFDM signals, comprising:
each receiver branch receiving a first bandwidth signal communicated in accordance with an OFDM access scheme and dividing the first bandwidth OFDM signal into multiple overlapping frequency subbands;

each receiver branch filtering the first bandwidth OFDM signal and passing an OFDM signal in a different one of the overlapping frequency subbands corresponding to a second bandwidth less than the first bandwidth;

each receiver branch analog-to-digital converting the passed OFDM signal into a digital OFDM signal, and digitally combining the digital OFDM signals from two or more of the plural receiver branches having adjacent corresponding frequency subbands without requiring a guard band being between adjacent ones of the corresponding frequency subbands to produce a received OFDM signal having a bandwidth substantially wider than the second bandwidth.

12. The method in claim 11, wherein combining the digital OFDM signals from two or more of the receiver branches having adjacent corresponding frequency subbands improves a blocking of undesirable signals outside of the first bandwidth.

13. The method in claim 11, wherein the receiver is a variable bandwidth receiver, the method further comprising:

selecting ones of the receiver branches to achieve a desired variable bandwidth.

14. The method in claim 13, further comprising:

selecting ones of the receiver branches that have corresponding frequency subbands that do not have interfering or blocking signals.

15. The method in claim 13, wherein each receiver branch includes an automatic gain controller, the method further comprising:

controlling a gain setting in the automatic gain controller for one of the selected receiver branches.

16. The method in claim 11, the method further comprising:

performing Fourier transform processing on the digital signals from selected ones of the receiver branches to generate multiple digital subband signals;

selecting some but not all of the digital frequency subband signals; and combining the selected digital frequency subband signals in the digital domain to produce the received signal.

17. The method in claim 16, wherein the selected digital frequency subband signals are selected as a contiguous block in a middle of the generated multiple digital frequency subband signals such that multiple frequency subbands at both an upper and lower end of the generated multiple digital frequency subband signals are not selected.

\* \* \* \* \*

UNITED STATES PATENT AND TRADEMARK OFFICE
CERTIFICATE OF CORRECTION

| | | |
|---|---|---|
| PATENT NO. | : 7,944,995 B2 | |
| APPLICATION NO. | : 11/545782 | |
| DATED | : May 17, 2011 | |
| INVENTOR(S) | : Skarby et al. | |

It is certified that error appears in the above-identified patent and that said Letters Patent is hereby corrected as shown below:

On the title page, item (57), under "ABSTRACT", in Column 2, Line 6, delete "that" and insert -- than --, therefor.

In Column 1, Line 49, delete "attenutation" and insert -- attenuation --, therefor.

In Column 2, Line 9, delete "bandwidith." and insert -- bandwidth. --, therefor.

In Column 2, Line 34, delete "less that" and insert -- less than --, therefor.

Signed and Sealed this
Ninth Day of August, 2011

David J. Kappos
*Director of the United States Patent and Trademark Office*